Figure 4:
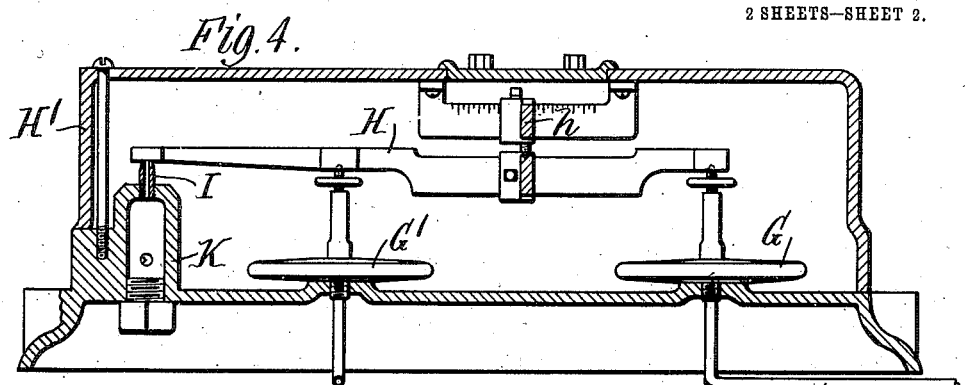

E. W. COMFORT & W. H. CARRIER.
DIFFERENTIAL THERMOSTATIC DEVICE.
APPLICATION FILED MAY 26, 1910.
1,018,551.
Patented Feb. 27, 1912.
2 SHEETS—SHEET 1.
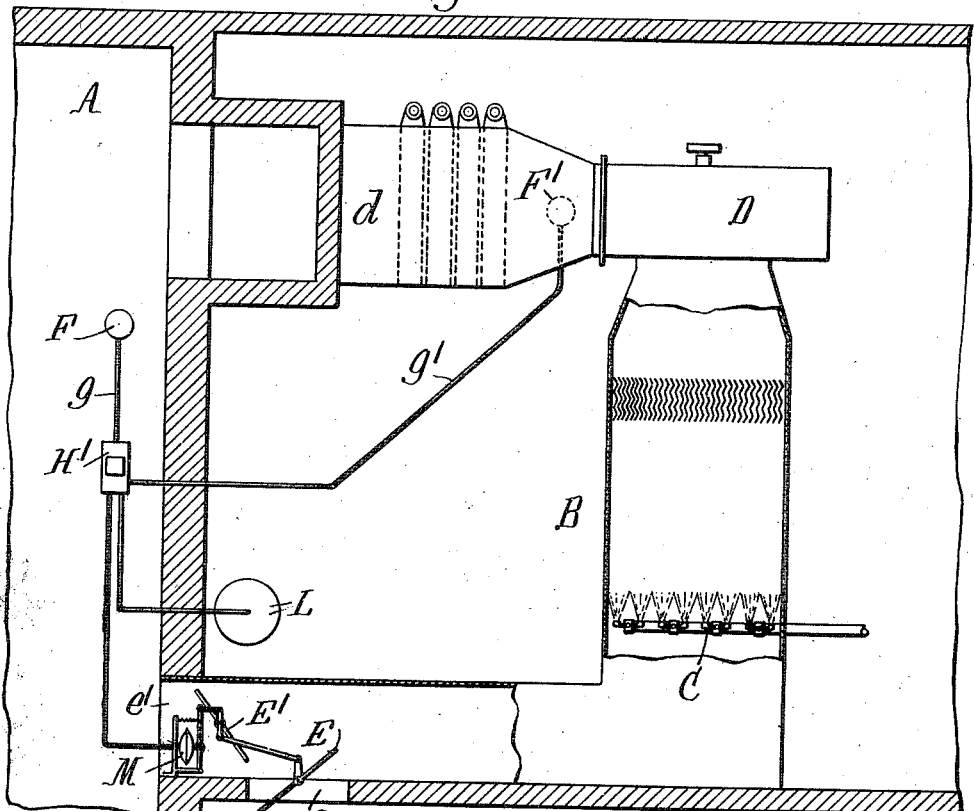
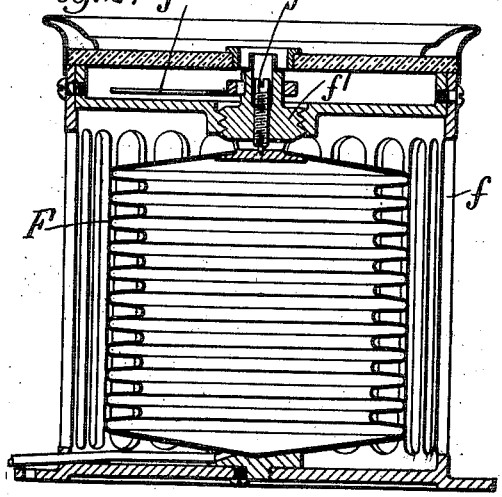
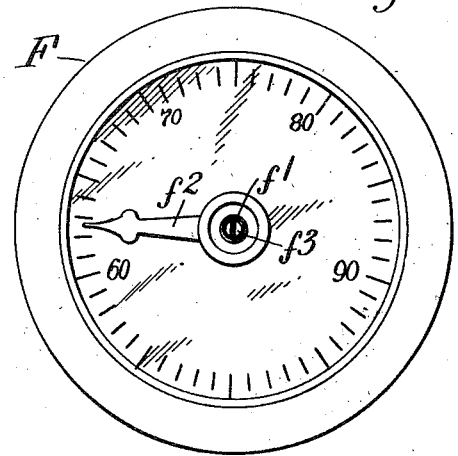

E. W. COMFORT & W. H. CARRIER.
DIFFERENTIAL THERMOSTATIC DEVICE.
APPLICATION FILED MAY 26, 1910.

1,018,551.

Patented Feb. 27, 1912.

2 SHEETS—SHEET 2.

Witnesses:
E. A. Volk.
C. H. Bund.

Inventors.
E. W. Comfort
and W. H. Carrier
by Wilhelm, Parker & Hund
Attorneys.

UNITED STATES PATENT OFFICE.

EDWARD W. COMFORT, OF CHICAGO, ILLINOIS, AND WILLIS H. CARRIER, OF BUFFALO, NEW YORK, ASSIGNORS TO BUFFALO FORGE COMPANY, OF BUFFALO, NEW YORK.

DIFFERENTIAL THERMOSTATIC DEVICE.

1,018,551.          Specification of Letters Patent.     Patented Feb. 27, 1912.

Application filed May 26, 1910. Serial No. 563,469.

*To all whom it may concern:*

Be it known that we, EDWARD W. COMFORT and WILLIS H. CARRIER, citizens of the United States, residing, respectively, at Chicago, in the county of Cook and State of Illinois, and at Buffalo, in the county of Erie and State of New York, have invented a new and useful Improvement in Differential Thermostatic Devices, of which the following is a specification.

This invention relates to differential thermostatic devices which are primarily used for automatically maintaining a predetermined difference between the temperatures of two mediums, or a prescribed relation between such temperatures, irrespective of temperature fluctuations in one or both of the mediums.

The invention is hereinafter described in connection with an apparatus for regulating the humidity of the air in a room or building by maintaining a prescribed relation between the temperature of the air in the building and that of humidified air supplied thereto, such as to produce the required percentage of relative humidity. The invention is not, however, restricted in application to devices for this purpose, but is applicable to other devices for effecting or indicating a prescribed or definite relation between the temperatures of two mediums.

The object of the invention is to produce an efficient and practical differential thermostatic device of this nature in which confined bodies of expansible fluid, either air or gas, subject to the temperatures of the two mediums, are utilized as the expansible thermostatic elements. This object is attained by employing two fluid pressure diaphragms or motors which operate in opposition to each other on a regulating device, or equivalent movable device, and are connected to two sealed receptacles which contain an expansible fluid under pressure and are separately influenced by the temperatures of the two mediums. Any suitable means under the control of the regulating device can be employed for varying the temperature of one or both of the mediums as required to secure the desired relation between the temperatures of the mediums. By making one of the fluid receptacles of variable capacity so as to alter the pressure of the fluid therein at a given temperature, the device can be adjusted to maintain a greater or less difference between the temperatures of the two mediums for effecting different results, such, for example, as maintaining one or another fixed percentage of humidity; and by making both fluid receptacles of variable capacity and making provision for varying the leverage with which the fluid pressure motors operate on the regulating device, still other relations between the temperatures of the mediums affecting the two thermostatic elements can be secured to produce other desired conditions.

Figure 5:
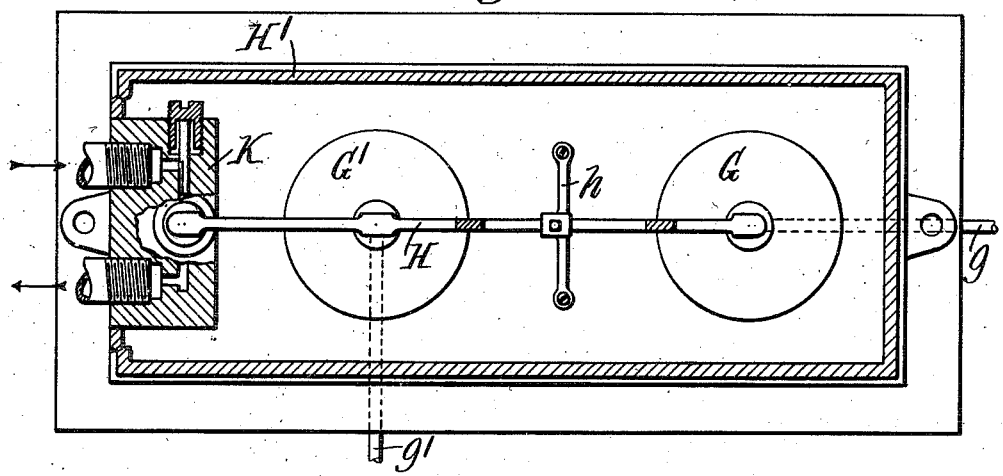
Figure 6:
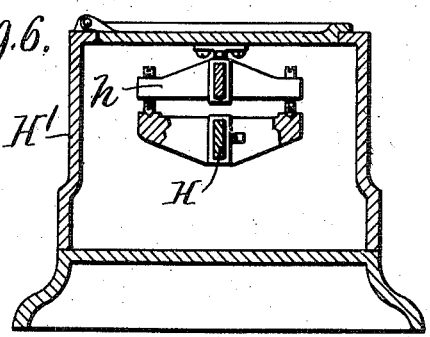

In the accompanying drawings, consisting of two sheets: Figure 1 is a diagrammatic sectional plan of a humidifying apparatus equipped with a thermostatic device embodying the invention for regulating the humidity of the air in a building. Fig. 2 is a sectional elevation of one of the thermostat elements. Fig. 3 is a plan thereof. Fig. 4 is a fragmentary sectional elevation of the regulating apparatus. Fig. 5 is a sectional plan thereof. Fig. 6 is a cross sectional elevation thereof.

Like letters of reference refer to like parts in the several figures.

In the apparatus shown in the drawings, the temperature of humidified or saturated air supplied to a building or inclosure is regulated so as to maintain a prescribed difference between the temperature of this air and the temperature of the air in the inclosure, to thereby maintain a fixed percentage of humidity in the inclosure irrespective of fluctuations in temperature therein, but, as before stated, the invention is applicable to apparatus for other purposes.

A represents a building or other inclosure in which the humidity of the air is to be controlled, B an air humidifying apparatus having spray nozzles or devices C for moistening the air and a fan D for delivering the moistened air into the inclosure through the discharge trunk d. The humidifying apparatus has air inlet openings e e' respectively for outside air and warm air returned from the inclosure. These inlet openings are controlled by dampers E E' which are adapted to be adjusted so as to vary the proportions of cold outside air and warm return air admitted to the humidifier and thereby regulate the temperature of the saturated air delivered to the inclosure A.

The humidifying apparatus can be of any suitable construction and the temperature of the saturated air can be regulated by any suitable instrumentalities controlled by the differential thermostatic device now to be described.

F and F' represent two thermostat elements consisting of hermetically sealed receptacles which are filled with air or other expansible fluid and are connected by small tubes g g' respectively to diaphragms or fluid pressure motors G G' of any suitable construction which exert pressure in opposition to each other on a movable regulator lever, or device H, the position of which depends upon the relative pressures produced by the expansible fluid in the two motors. The thermostat elements or receptacles F F' are placed in any convenient locations so as to be separately influenced by the temperatures of the two mediums, the relation of which it is desired to regulate. For instance, in the apparatus shown, one element or receptacle F is located in the inclosure A and the other is located in the discharge trunk d of the humidifying apparatus.

One of the receptacles, preferably the one F which is located in the inclosure A, is made adjustable so that its capacity can be altered to decrease or increase the pressure of the fluid therein at a given temperature. This receptacle, as shown in Figs. 2 and 3, consists of a sheet metal cylinder having a corrugated wall which allows it to be expanded or collapsed lengthwise more or less. It is arranged in a frame or cage f with one end fixed to the cage and with the opposite movable end held by the internal pressure against a screw adjuster f' adapted to turn in a threaded hole in the adjacent end of the cage. By turning this adjuster in one direction or the other the receptacle can be collapsed or allowed to expand more or less to increase or decrease the pressure of the fluid therein at a given temperature. The adjuster is provided with a pointer $f^2$ coöperating with a graduated scale on the cage to enable the adjustment of the receptacle for different pressures, which, in the apparatus shown, may be expressed either as degrees difference in temperature, or percentages of relative humidity corresponding to fixed differences in temperature. A screw $f^3$ working in a threaded hole in the adjuster f' and bearing against the end of the receptacle increases the range of adjustment and also enables the receptacle to be initially adjusted to accord with the scale since the screw $f^3$ can be turned in the adjuster f' without turning the latter and the pointer $f^2$ attached thereto. The element F can be of any other suitable construction which permits the capacity thereof to be regulated.

Both of the thermostat elements can be of the construction described, but in the application of the device shown in this case only one receptacle need be adjustable in capacity and any suitable receptacle of fixed capacity can be used for the other element.

The regulating lever or device H, in the apparatus shown, is arranged in a casing H' and is fulcrumed between the fluid pressure motors G G' on a fulcrum block h. If the regulating device is intended for maintaining a fixed difference between the temperatures of the two mediums affecting the two elements, as in the apparatus illustrated, the fulcrum block h for the lever can be fixed midway between the fluid pressure motors, but the fulcrum block is preferably adjustable so that the relative leverage of the two motors on the regulating device can be changed in order to adapt the instrument for producing different desired results.

Any suitable means controlled by the regulating lever or device H can be utilized for performing the regulating action. In the apparatus shown, the free end of the regulating lever H constitutes a valve which coöperates with an escape port I for controlling the air pressure in a pipe connection K for conveying compressed air from a supply tank L to a compressed air motor M which actuates the inlet dampers E and E' of the humidifying apparatus B. The position of the dampers E E', and consequently the temperature of the humidified air delivered to the inclosure, will depend upon the position of the regulating lever or device H, which in turn is dependent upon the difference in the temperatures affecting the two thermostat elements F and F' and the consequent difference in the opposing pressures which the two motors G and G' exert on the regulating lever or device H.

We claim as our invention:

1. In a differential thermostatic apparatus, the combination of two receptacles containing expansible fluid and separately influenced by the temperatures of two mediums, and a movable device on which the pressures of the fluid in said receptacles are exerted in opposition to each other, whereby the operation of said movable device is dependent upon the relation existing between the temperatures of said mediums, substantially as set forth.

2. In a differential thermostatic apparatus, the combination of two receptacles containing expansible fluid and separately influenced by the temperature of two mediums, fluid pressure motors which are actuated by the pressures of the fluid in said receptacles, and a movable device on which said motors exert pressure in opposition to each other, whereby the operation of said movable device is dependent upon the relation existing between the temperatures of said mediums.

3. In a differential thermostatic apparatus, the combination of two receptacles containing expansible fluid and separately influenced by the temperatures of two mediums, fluid pressure motors which are actuated by the pressures of the fluid in said receptacles, and a movable device for maintaining a definite relation between the temperatures of said mediums on which said motors exert pressure in opposition to each other, whereby the operation of said movable device is dependent upon the relation existing between the temperatures of said mediums, substantially as set forth.

4. In a differential thermostatic apparatus, the combination of two receptacles containing expansible fluid and separately influenced by the temperatures of two mediums, and a movable device for regulating the temperature of at least one of said mediums on which device the pressures of the fluid in said receptacles are exerted in opposition to each other, whereby the regulating action of said device is dependent upon the relation between the temperatures of said mediums, substantially as set forth.

5. In a differential thermostatic apparatus, the combination of two receptacles containing expansible fluid and separately influenced by the temperatures of two mediums, and a movable device for maintaining a definite relation between the temperatures of said mediums on which device the pressures of the fluid in said receptacles are exerted in opposition to each other, substantially as set forth.

6. In a differential thermostatic apparatus, the combination of two receptacles containing expansible fluid and separately influenced by the temperatures of two mediums, a movable device on which the pressures of the fluid in said receptacles are exerted in opposition to each other, and means controlled by said movable device for regulating the temperature of one of said mediums, substantially as set forth.

7. In a differential thermostatic apparatus, the combination of two receptacles containing expansible fluid and separately influenced by the temperatures of two mediums, fluid pressure motors which are actuated by the pressures of the fluid in said receptacles, and a regulating lever on which said motors exert pressure at opposite sides of the lever fulcrum, substantially as set forth.

8. In a differential thermostatic apparatus, the combination of two receptacles containing expansible fluid and separately influenced by the temperatures of two mediums, at least one of said receptacles being adjustable in capacity for regulating the fluid pressure therein at a given temperature, and a movable device on which the pressures of the fluid in said receptacles are exerted in opposition to each other, substantially as set forth.

9. In a differential thermostatic apparatus, the combination of two receptacles containing expansible fluid and separately influenced by the temperatures of two mediums, at least one of said receptacles being adjustable in capacity for regulating the fluid pressure therein at a given temperature, a lever on which the pressures of the fluid in said receptacles are exerted in opposition to each other, and means for varying the leverage with which the fluid pressures operate on said lever, substantially as set forth.

10. In a differential thermostatic apparatus for regulating the humidity of the air in an inclosure, the combination of means for supplying humidified air to the inclosure, two receptacles containing expansible fluid, one of which is subject to the temperature in the inclosure and the other of which is subject to the temperature of said humidified air, a device on which the pressures of the fluid in said receptacles operate, and means controlled by said device for maintaining a predetermined difference in temperature between the air in the inclosure and the humidified air, substantially as set forth.

11. In a differential thermostatic apparatus for regulating the humidity of the air in an inclosure, the combination of means for supplying humidified air to the inclosure, two receptacles containing expansible fluid, one of which is subject to the temperature in the inclosure and the other of which is subject to the temperature of said humidified air, a device on which the pressures of the fluid in said receptacles operate, and means controlled by said device for regulating the temperature of the humidified air to maintain a predetermined difference in temperature between the air in the inclosure and the humidified air, substantially as set forth.

12. In a differential thermostatic apparatus for regulating the humidity of air in an inclosure, the combination of means for supplying humidified air to the inclosure, two receptacles containing expansible fluid, one of which is subject to the temperature in the inclosure, and the other of which is subject to the temperature of said humidified air, fluid pressure motors which are actuated by the pressures of the fluid in said receptacles, a device on which said motors exert pressure in opposition to each other, and means controlled by said device for maintaining a predetermined difference in temperature between the air in the inclosure and the humidified air.

Witness my hand, this 20th day of May, 1910.

EDWARD W. COMFORT.

Witnesses:
J. H. DUNDAS,
J. ARTHUR DUNDAS.

Witnesses my hand, this 23rd day of May, 1910.

WILLIS H. CARRIER.

Witnesses:
EDWARD C. HARD,
C. B. HORNBECK.